United States Patent [19]

Karakawa et al.

[11] 3,951,101

[45] Apr. 20, 1976

[54] APPARATUS FOR COATING BOTTLES WITH RESIN

[75] Inventors: Kouichi Karakawa, Chibashi; Akiharu Yamada; Hajime Kanbeshiyama, both of Tamanoshi; Yasunori Ishii, Ichiharashi, all of Japan

[73] Assignee: Mitsui Shipbuilding & Engineering Co., Ltd., Tokyo, Japan

[22] Filed: Oct. 25, 1974

[21] Appl. No.: 518,105

[30] Foreign Application Priority Data

Oct. 26, 1973 Japan .............................. 48-120474

[52] U.S. Cl. ................................ 118/301; 118/322; 118/503; 279/2 R; 279/50

[51] Int. Cl.[2] ...................... B05C 5/00; B05C 13/02

[58] Field of Search ........... 118/322, 301, 503, 320, 118/500; 279/50, 2

[56] References Cited

UNITED STATES PATENTS

| | | | |
|---|---|---|---|
| 855,280 | 5/1907 | Campbell | 279/50 |
| 2,138,012 | 11/1938 | Perr | 279/50 |
| 2,210,187 | 8/1940 | Ross | 118/322 X |
| 2,270,132 | 1/1942 | Malloy et al. | 118/320 X |
| 2,291,823 | 8/1942 | Mickelson et al. | 279/2 X |
| 2,574,686 | 11/1951 | Brown | 118/322 X |
| 2,600,161 | 6/1952 | Fouse | 118/301 X |
| 3,296,999 | 1/1967 | Gamble | 118/322 X |
| 3,854,439 | 12/1974 | Harmuth | 118/500 X |

FOREIGN PATENTS OR APPLICATIONS

| | | | |
|---|---|---|---|
| 675,593 | 4/1939 | Germany | 118/301 |

*Primary Examiner*—John P. McIntosh
*Attorney, Agent, or Firm*—Howson and Howson

[57] ABSTRACT

Apparatus for coating bottles with resin in order to prevent the explosion thereof characterized in that the bottle is held by a holder at the mouth portion and at its inner wall, so that the bottle may be invisibly coated with resin except for the mouth portion and bottom.

3 Claims, 5 Drawing Figures

APPARATUS FOR COATING BOTTLES WITH RESIN

The present invention relates to an apparatus for coating bottles with resin to prevent the explosion thereof, in which powdery or liquid resin is sprayed onto the bottles and caused to adhere by heating the bottle.

It is desirable to coat the bottle with resin, except for the mouth portion and the bottom in view of sanitary requirements and the desirability inspection of interior of the bottle by observation through the bottom, and further to form an invisible coating film.

If the coating is performed in such a manner that the edge of the film is terminated at the shoulder or jaw-like part of the bottle, the treatment may be such that the film edge is invisible. However, in apparatus in which the bottle is held by grippers at the mouth and bottom, it is inevitable to form a conspicuous edge line at the position near the bottom, though the upper edge of the film may be invisibly terminated at the jaw of the mouth portion.

Therefore, the object of the present invention is to provide an apparatus by which resin may be coated on the bottle so as to be invisible.

To this end, the apparatus comprises a series of holders provided on a conveyer chain at a predetermined spacing from each other, each holder comprises an inner holding device and mouth gripper for holding the bottle without gripping the bottom portion. If the bare inner holding device which is not positioned within the bottle before and after coating stage, is coated with resin, the gripping or holding mechanism of the holder would be damaged by the coated resin. To avoid this disadvantage, in accordance with the present invention, the holder is caused to be rotated about a shaft, whereby the holder may be located in a position remote from the resin spray gun.

Other and further objects and advantages of the present invention will appear more fully from the following description taken in connection with the accompanying drawings, wherein.

Figures 1, 2, 3, 4, 5:
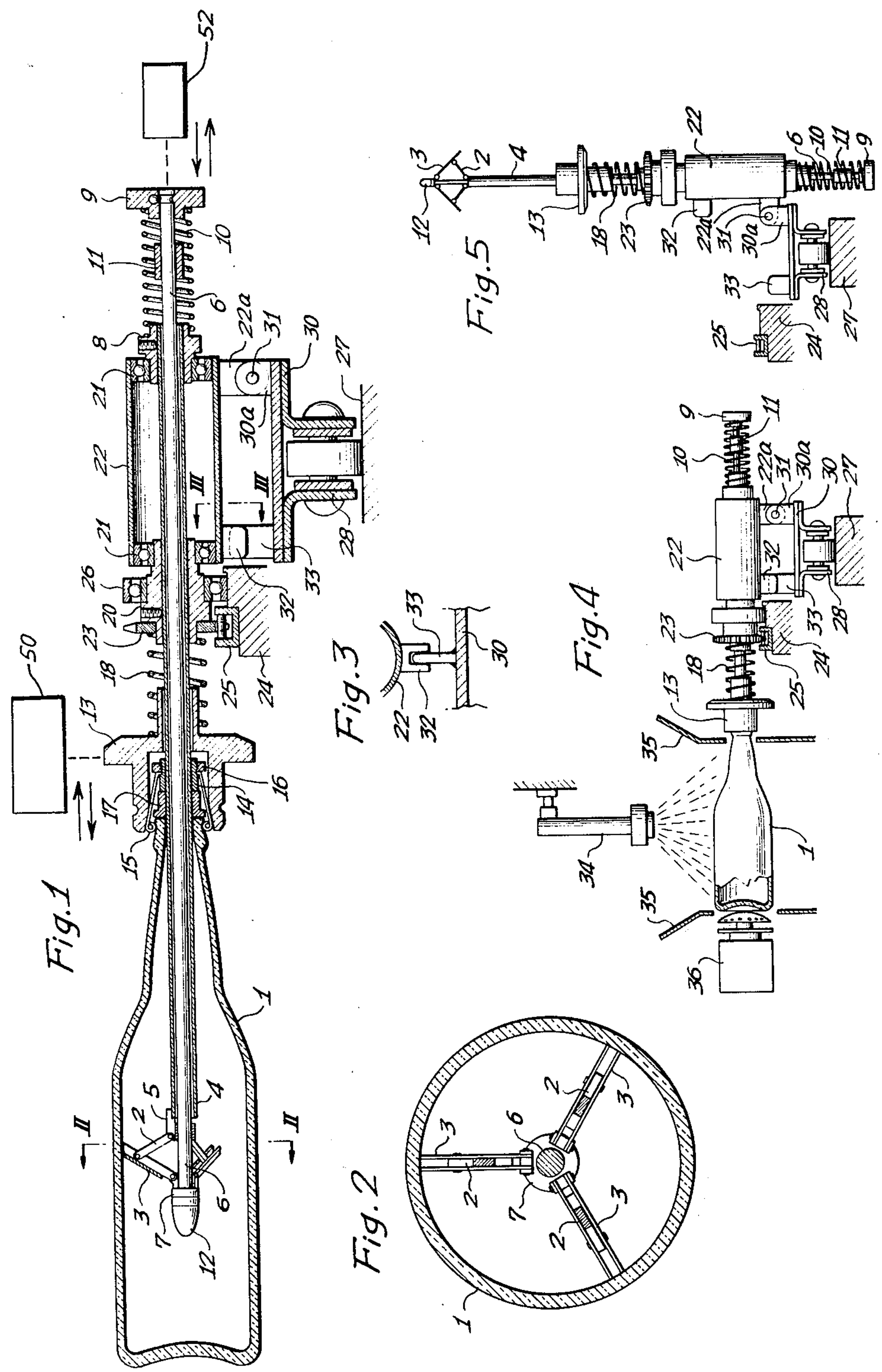
FIG. 1 is a sectional side view of a coating apparatus according to the present invention.
FIG. 2 is a sectional view taken along the line II—II in FIG. 1.
FIG. 3 is a sectional view taken along the line III—III in FIG. 1.
FIGS. 4 and 5 are side views of the coating apparatus in operation.

Referring to the drawings and more particularly to FIGS. 1 and 2, each bottle 1 is held by a bottle holder which comprises an inner holding device and a mouth gripper. The inner holding device comprises a tube 4 having a diameter to permit the insertion thereof into the bottle, shaft 6 slidably provided in the tube 4 and link mechanisms radially disposed about said shaft 6. Each link mechanism comprises the first link 2 and second link 3 linked to each other. One end of the first link 2 is linked to the mid portion of the second link 3 and the other end is linked to the member 5 secured to the end of the tube 4. The base end of the second link 3 is pivoted to the member 7 provided on the end of the shaft 6. Ball bearings 21 are provided on bushes 8 and 20 which are secured to the tube 4, whereby the tube 4 is rotatably supported in the housing 22. A compression spring 10 is provided between the bush 8 and the member 9 secured to the other end of the shaft 6 to urge the shaft 6 towards the right to spread the link mechanism. A stopping member 11 is provided on the shaft 6 to limit the leftward movement of the shaft. On the end of the shaft 6 is provided a center guide 12 which acts as guiding member when the shaft is inserted into the bottle.

The mouth gripper comprises a cylindrical casing 13 slidably mounted on the tube 4, a plurality of gripping leaf springs 15 and a cushion 17 secured to the tube. Each spring 15 is secured to the sleave 14 by the nut 16, the sleeve 14 being secured to the tube. A compression spring 18 is provided between the casing 13 and sprocket 23 secured to the bush 20 to urge the casing towards the left to close leaf springs 15 to grip the bottle mouth.

The sprocket 23 is engaged with the pin rack 25 provided on the guide rail 24. A roller 26 is provided on the bush 20 to be rolled on the guide rail 24.

Thus composed bottle holders are provided on the endless conveyer chain 28 at a predetermined spacing from each other. More particularly, the housing 22 of each bottle holder is provided with a connecting member **22*a* and guiding member 32. The connecting member 22*a* is pivotally connected to the connecting member 30*a* of attachment 30 of the chain 28 by the pin 31. The guiding member 32 has a recess as shown in FIG. 3 with which the engaging plate 33 of the attachment 30** is engaged.

Referring to FIG. 4, in the coating room, spray guns 34 are provided to spray the resin powder onto the bottle. In order to prevent adhesion of resin on the mouth portion and bottom, cover plates 35 are provided at the jaw portion and bottom corner. In addition, an air or inert gas blowing device 36 is provided to blow the gas against the bottom of the bottle to prevent the adhesion of resin thereto.

In order to hold the bottle, the casing 13 is slid to the right by any appropriate means, as indicated schematically at 50 in FIG. 1, to open the leaf springs 15 and the member 9 is pushed to the left to close the links 2 and 3 by any appropriate means as indicated schematically at 52 in FIG. 1. Thereafter, the shaft 6 is inserted into the bottle together with the tube 4 until the cushion 17 abuts on the top of the bottle. Then, the casing 13 and member 9 are released so that they are moved by springs 18 and 10 towards the initial position. Accordingly the links 2 and 3 are opened and leaf springs 15 are closed, so that ends of link 3 are resiliently engaged with the inner wall of the bottle and leaf springs 15 grip the bottle mouth. Thus, the bottle is held by the holder. To remove the bottle from the holder, the above described operation is performed in the reverse order.

The endless chain 28 is moved to convey bottles to the coating room continuously. During the conveying, the bottle is held in the horizontal position and rotated together with the tube 4 and shaft 6 by engagement of the sprocket with the pin rack 25. In the coating room, resin powder is sprayed from the gun 34 and adhered to the bottle by an electrostatic painting method. The inert gas blowing device 36 acts to blow the gas onto the bottom of the bottle and cover plates 35 shield the bottle mouth and bottom of the bottle. Thus adhesion of resin powder to the bottom and mouth is prevented and edges of the coated film are formed at the jaw portion and bottom corner. Thereafter, the bottle is heated to melt the resin powder to coat the bottle and cooled in successive stages and the coated bottle is removed from the holder. As shown in FIG. 5, the empty holder is held in the vertical position by a suitable guide member (now shown) and conveyed so as to locate the holder end in the position remote from the spray gun 34, so that adhesion of resin powder to the link mechanism of the holder is prevented.

Since edges of the coated film are formed at the jaw portion and bottom corner, the edge lines are invisible.

What is claimed is:

1. Apparatus for coating bottles with resin comprising an endless conveyer chain provided to pass through a resin spraying zone, a series of spaced apart bottle holders provided on said conveyer chain, resin spraying guns provided in said zone, and cover plates provided in said zone to shield the mouth portion and bottom of the bottle, each bottle holder comprising a housing provided on the conveyer chain, a tube extending in the perpendicular direction to the moving direction of the conveyer chain and rotatably supported in said housing, said tube having a diameter permitted to be inserted into the bottle, a shaft slidably provided in said tube, inner holding means comprising a link mechanism provided on one end of said tube and shaft, said link mechanism being adapted to be opened by sliding of the shaft to be engaged with the inner wall of the bottle and to be closed to permit the insertion thereof into the bottle, mouth gripping means provided on said tube, means for rotating said tube during the movement of the conveyer chain, means for sliding said shaft for opening and closing said inner holding means, and means for actuating said mouth gripping means.

2. Apparatus for coating bottles with resin in accordance with claim 1 wherein said housing is provided on the conveyer chain rotatably about an axis disposed in the moving direction of the conveyer chain, and means for pivoting the housing about said axis is provided.

3. Apparatus for coating bottles with resin in accordance with claim 1 wherein a gas blowing device is provided in said resin spraying zone to prevent the adhesion of the resin to the bottom of bottle.

* * * * *